United States Patent
Harmer et al.

(10) Patent No.: US 6,169,053 B1
(45) Date of Patent: Jan. 2, 2001

(54) SILYLATED PERFLUORINATED ION-EXCHANGE MICROCOMPOSITE CATALYSTS

(75) Inventors: Mark Andrew Harmer; Qun Sun, both of Wilmington, DE (US)

(73) Assignee: E. I. du Pont de Nemours and Company, Wilmington, DE (US)

( * ) Notice: Under 35 U.S.C. 154(b), the term of this patent shall be extended for 0 days.

(21) Appl. No.: 09/381,541

(22) PCT Filed: Mar. 19, 1998

(86) PCT No.: PCT/US98/05544

§ 371 Date: Sep. 21, 1999

§ 102(e) Date: Sep. 21, 1999

(87) PCT Pub. No.: WO98/42439

PCT Pub. Date: Oct. 1, 1998

Related U.S. Application Data

(60) Provisional application No. 60/042,768, filed on Mar. 26, 1997.

(51) Int. Cl.$^7$ .............................. B01J 31/06; B01J 31/08
(52) U.S. Cl. .................. 502/159; 502/168; 502/402; 502/407; 502/158
(58) Field of Search .................. 502/159, 168, 502/402, 407, 158

(56) References Cited

U.S. PATENT DOCUMENTS

| | | | |
|---|---|---|---|
| 4,038,213 | 7/1977 | McClure et al. | |
| 5,916,837 | * 6/1999 | Harmer et al. | 502/170 |
| 5,932,511 | * 8/1999 | Harmer et al. | 502/159 |
| 5,948,946 | * 9/1999 | Harmer et al. | 585/669 |
| 6,034,290 | * 3/2000 | Harmer et al. | 570/236 |

FOREIGN PATENT DOCUMENTS

| | | |
|---|---|---|
| 0 503 688 A2 | 2/1987 | (EP) . |
| WO 95/19222 | 7/1995 | (WO) . |
| WO 96/19288 | 6/1996 | (WO) . |

OTHER PUBLICATIONS

Mauritz, K.A. et al., Nafion–Based Microcomposites: Silicon Oxide–Filled Membranes, *Polym. Mater. Sci. Eng.*, 58, 1079–1082 (1998).

Olah, George A. et al., Perfluorinated Resinsulfonic Acid (Nafion–H®) Catalysis in Synthesis, *Synthesis*, 513–531 (1986).

Waller, F. J., Catalysis with Metal Cation–Exchanged Resins, *Catal. Rev.–Sci.Eng.*, 1–12 (1986).

Stang, Peter J. et al., Perfluoroalkanesulfonic Esters: Methods of Preparation and Applications in Organic Chemistry, *Synthesis*, 85–126 (1982).

Procopiou, Panayiotis et al., An extremely fast and efficient acylation reaction of alcohols with acid anhydrides in the presence of trimethylsily trifluoromethanesulfonate as catalyst, *J. Chem. Soc. Chem. Commun.*, 2625–2626 (1996).

* cited by examiner

*Primary Examiner*—Elizabeth D. Wood

(57) ABSTRACT

This invention concerns a silylated porous microcomposite comprising a perfluorinated ion-exchange polymer entrapped within and highly dispersed throughout a network of inorganic oxide wherein the network and optionally the polymer have been modified with a silylating agent. These silylated microcomposites can be used in heterogeneous catalyst compositions for various chemical processes, such as in esterifications and acylations.

12 Claims, No Drawings

10 # SILYLATED PERFLUORINATED ION-EXCHANGE MICROCOMPOSITE CATALYSTS

This application claim benefit to provisional application No. 60/042,768 filing date Mar. 26, 1997.

FIELD OF THE INVENTION

This invention concerns catalysts comprising chemically modified perfluorinated ion-exchange microcomposites, processes for their preparation and their use as catalysts in chemical processes.

TECHNICAL BACKGROUND

K. A. Mauritz et al., Polym. Mater. Sci. Eng. 58, 1079–1082 (1988), in an article titled "Nafion-based Microcomposites: Silicon Oxide-filled Membranes", discuss the formation of micro composite membranes by the growth of silicon oxide microclusters or continuous silicon oxide interpenetrating networks in pre-swollen "NAFION®" sulfonic acid films. NAFION® is a registered trademark of E. I. du Pont de Nemours and Company.

U.S. Pat. No. 4,038,213 discloses the preparation of catalysts comprising perfluorinated ion-exchange polymers containing pendant sulfonic acid groups on a variety of supports.

The catalyst utility of perfluorinated ion-exchange polymers containing pendant sulfonic acid groups, supported and unsupported has been broadly reviewed: G. A. Olah et al., Synthesis, 513–531 (1986) and F. J. Wahler, Catal. Rev.-Sci. Eng., 1–12 (1986).

WO 95/19222 describes a porous microcomposite comprising a perfluorinated ion-exchange microcomposite containing pendant sulfonic acid and/or carboxylic acid groups entrapped within and highly dispersed throughout a network of metal oxide. These catalysts are differentiated from NAFION® supported catalysts in that by virtue of the preparation of the microcomposite catalyst, the polymer becomes intimately mixed with a metal oxide precursor in solution, and thus becomes thoroughly entrapped and highly dispersed throughout a resulting network of metal oxide. With the polymer being mechanically entrapped within the metal oxide network and not merely on the surface of a support, as is the case in supported catalysts, the catalytic activity of these microcomposite catalysts is significantly increased.

P. J. Stang, M. Hanack and L. R. Subramian, "Perfluoroalkanesulfonic Esters: Methods of Preparation and Applications in Organic Chemistry", Synthesis, 1982, 85–126, discuss the utility of perfluoroalkanesulfonic esters, for example, trimethylsilyl trifluoromethanesulfonate (TMSOTf), as homogeneous catalysts for a range of reactions. P. A. Procopiou, S. P. D. Baugh, S. S. Flack and G. G. A. Inglis, J. Chem. Soc., Chem. Comm., 1996, 2625 disclose the utility of TMSOTf as an effective homogeneous catalyst for the acylation of alcohols with acid anhydrides.

Although a variety of reactions can be beneficially catalyzed by the compounds and the composites cited above, there is still a need for heterogeneous catalysts of increased activity and selectivity and broader applications.

SUMMARY OF THE INVENTION

The present invention provides a silylated porous microcomposite, comprising: a perfluorinated ion-exchange polymer containing pendant groups selected from the group consisting of: sulfonic acid groups, silyl sulfonate groups, and a combination of said groups, wherein the polymer is entrapped within and highly dispersed throughout a network of inorganic oxide, said network having a plurality of silylated species bonded thereto.

The present invention also provides a process for the preparation of a silylated porous microcomposite, comprising the steps of: contacting a porous microcomposite comprising a perfluorinated ion-exchange polymer containing pendant sulfonic acid groups or pendant metal sulfonate groups, wherein said polymer is entrapped within and highly dispersed throughout a network of inorganic oxide, with a silylating agent under silylating conditions for a time sufficient to convert a plurality of hydroxyl groups of the inorganic oxide network to a silylated species and a portion of the sulfonic acid groups or metal sulfonate groups to silyl sulfonate groups.

The present invention also provides an improved method for the acylation of an alcohol with an acid anhydride, the improvement comprising using an effective amount of a catalyst composition comprising a silylated porous microcomposite comprising a perfluorinated ion-exchange polymer containing pendant groups selected from the group consisting of: sulfonic acid groups, silyl sulfonate groups, and a combination of said groups, wherein the polymer is entrapped within and highly dispersed throughout a network of inorganic oxide, said network having a plurality of silylated species bonded thereto.

DETAILED DESCRIPTION OF THE INVENTION

It is believed that key features of the present invention include the modification of a plurality of the residual hydroxyl groups of the inorganic oxide network to silylated species and optional modification of all or a portion of the pendant sulfonic acid groups of a perfluorinated ion-exchange polymer of a porous microcomposite to silyl sulfonate groups.

The present invention concerns the silylation of a porous microcomposite. By "porous microcomposite" is meant a composition comprising a perfluorinated ion-exchange polymer (PFIEP) containing pendant sulfonic acid groups, wherein said polymer is entrapped within and highly dispersed throughout a network of inorganic oxide. The PFIEP may optionally further comprise pendant carboxylic acid groups. The percentage of the perfluorinated ion-exchange polymer in the microcomposite is from 0.1 to about 90% by weight and the size of the pores in the microcomposite is about 1 nm to about 75 nm, and the microcomposite optionally further comprises pores having a size in the range of about 75 nm to about 1000 nm. Such microcomposites are described in U.S. application Ser. No. 08/574,751, filed Dec. 19, 1995 incorporated by reference herein and in the corresponding PCT publication WO 95/19222. The microcomposite can be in any size or shape to be utilized in the present invention, such as ground into particles or shaped into spheres. The PFIEP is preferably, a sulfonated NAFION® PFIEP. The weight percentage of PFIEP preferably ranges from about 5% to about 80%, most preferably from about 10% to about 15%. The inorganic oxide of the network is preferably silica, alumina, titania, germania, zirconia, alumino-silicate, zirconyl-silicate, chromic oxide, iron oxide, or mixture thereof; most preferably silica.

The inorganic oxide network of the present modified porous microcomposite has a plurality of silylated species bonded thereto. By "having a plurality of silylated species bonded thereto" is meant that a portion of the hydroxyl groups of the inorganic oxide network, preferably at least 50% of the hydroxyl groups, most preferably at least 80% of the hydroxyl groups, are converted to a silylated species via reaction with a silylating agent, and this silylated species remains bonded to the inorganic oxide network. As is known, after formation of an inorganic oxide network, there are numerous residual hydroxyl groups. This is because during network formation each of the inorganic atoms become constituents of a network structure via bonds to other inorganic atoms through oxygen but condensation to form these crosslinks does not go to 100% completion; there are residual, uncrosslinked hydroxyl groups. For example, in the present case where the inorganic oxide of the network is silica, silanol (Si—OH) groups can be found as part of the network, and it is a plurality of the hydroxyl (—OH) groups of these silanols that are converted to silylated species which remain bonded to the network.

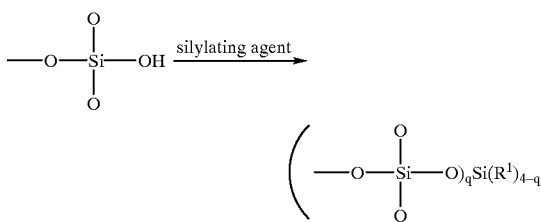

By "silylated species" is meant a group having the formula $-O)_q Si(R^1)_{4-q}$, wherein oxygen is bonded to the inorganic oxide network, each $R^1$ is independently selected from the group consisting of chloride, and a monovalent hydrocarbon radical, preferably $C_1$ to $C_{12}$ alkyl or aryl, such as methyl, ethyl, propyl, butyl, and phenyl; most preferably methyl; and q is 1, 2 or 3. Thus, silylated species also include those instances where bridging and/or crosslinking has occurred during silylation of the precursor hydroxyl groups.

The pendant groups of the PFIEP of the silylated porous microcomposite can be sulfonic acid groups, silyl sulfonate groups, or a combination of these two groups. The sulfonic acid groups are of the formula —SO$_3$H. The silyl sulfonate groups can be of the formula

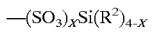

wherein:
each $R^2$ is independently chloride, or a monovalent hydrocarbon radical, preferably $C_1$ to $C_{12}$ alkyl or aryl, such as methyl, ethyl, propyl, butyl, and phenyl, most preferably methyl; and x is 1, 2 or 3. Bridging and/or crosslinking between two or more sulfonate groups is possible. For example, silyl sulfonate groups could be represented by the following:

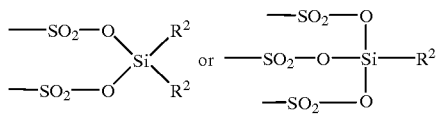

A representative example of a silyl sulfonate group is —SO$_3$Si(CH$_3$)$_3$.

The silylated microcomposites of the present invention differ from their precursor (i.e., the porous microcomposites) in their wettability. The silylated microcomposites are hydrophobic.

This invention further provides a process for the preparation of said silylated porous microcomposite comprising contacting a porous microcomposite, as defined above, or a porous microcomposite having pendant metal, preferably silver, sulfonate groups, with an effective amount of a silylating agent under silylating conditions for a time sufficient to convert a plurality of hydroxyl groups of the inorganic oxide network to silylated species and a portion of the sulfonic acid groups or metal sulfonate groups to silyl sulfonate groups.

By "silylating agent" is meant a substance capable of silylating the inorganic oxide network and, optionally all or a portion of the sulfonic acid groups of the PFIEP. The silylating agent can comprise a compound represented by the formula $Si(R^3)_{4-n}X_n$, wherein X is chloride or trifluoromethanesulfonate; each $R^3$ is independently selected from a monovalent hydrocarbon radical, preferably a $C_1$ to $C_{12}$ alkyl or aryl, such as methyl, ethyl, propyl, butyl, and phenyl, most preferably methyl; and n is an integer from 1 to 4.

Certain silylating agents have more than one leaving group (binding site) on the silicon atom, for example $(C_6H_5)_2SiCl_2$ and $C_6H_5SiCl_3$. For those cases where n is greater than 1, it is possible that an X remains on the silicon atom and becomes part of the silyl sulfonate group or silylated species. For those cases, X is preferably chloride. In addition, it makes possible the bridging and/or crosslinking between two or more silylated species and/or between two or more silyl sulfonate groups.

Alternatively, the silylating agent can comprise a compound represented by the formula $R^4R^5R^6SiNHSiR^7R^8R^9$, wherein $R^4$, $R^5$, $R^6$, $R^7$, $R^8$, and each independently selected from the group consisting of chloride and a monovalent hydrocarbon radical, preferably a $C_1$ to $C_{12}$ alkyl or aryl, such as methyl, ethyl, propyl, butyl, and phenyl, most preferably methyl. Preferred silylating agents include trimethylsilylchloride, trimethylsilyl trifluoromethanesulfonate and hexamethyldisilazine.

Contact with the silylating agent can be accomplished in a number of ways, for example, in a gas phase, in a liquid phase or via sublimation, depending on the silylating agent selected.

It is preferred that the reactant material, the porous microcomposite, as defined above, or the porous microcomposite having PFIEP with pendant metal sulfonate groups, be substantially dry and that the present process be carried out under essentially anhydrous conditions. Small amounts of water can be overcome by using an excess of the silylating agent.

A solvent, essentially non-reactive with the silylating agent, can be employed, or the present process can be carried out using excess silylating agent as the solvent/suspension media.

The silylation reaction of the present process can be carried out at any convenient temperature. The use of the reflux temperature of the solvent/suspension media is particularly convenient.

During the present process, the pendant sulfonic acid groups and/or the pendant silver sulfonate groups of the PFIEP can remain unchanged or all or a portion of said pendant groups can be converted to silylated sulfonate groups. After completion of the reaction, excess silylating reagent can be removed by heating the product in vacuum.

The silylated porous microcomposite product can be filtered and washed with a solvent. Suitable solvents include, but are not limited to alkanes, such as hexane and heptane, and chlorinated solvents such as methylene chloride.

The utility of the silylated porous microcomposites of the present invention is in catalyst compositions including use, for example, in esterification or acylation reactions.

The present invention further provides an improved method for the acylation of an alcohol with an acid anhydride, the improvement comprising using an effective amount of a catalyst composition comprising a silylated porous microcomposite comprising a perfluorinated ion-exchange polymer containing pendant groups selected from the group consisting of: sulfonic acid groups, silylated sulfonate groups, and a combination of said groups, wherein the polymer is entrapped within and highly dispersed throughout a network of inorganic oxide, said network having a plurality of silylated species bonded thereto.

Preferably, the perfluorinated ion-exchange polymer contains sulfonic acid groups and trimethylsilyl sulfonate groups and is about 10 to about 15% by weight of the microcomposite. It is also preferred the inorganic oxide of the network is silica and that the silylated species is a group having the formula —OSiR$^1$R$^2$R$^3$, wherein: R$^1$, R$^2$, and R$^3$ are each independently selected from the group consisting of: chloride, and a monovalent hydrocarbon radical.

EXAMPLES

A 13 wt % NAFION® resin in silica microcomposite catalyst, referred to in the examples below as the unmodified microcomposite, was prepared as described in the next paragraph using a NAFION® PFIEP NR 005 solution. NAFION® PFIEP NR 005 solution is available from DuPont NAFION® Products, Fayetteville, N.C., is also known as NAFION® SE-5110, and is prepared from resin which is approximately 6.3 tetrafluoroethylene molecules for every perfluoro(3,6-dioxa-4-methyl-7-octenesulfonyl fluoride) molecule ($CF_2$=CF—O—($CF_2$CF($CF_3$)—O—$CF_2CF_2$—$SO_2$F). After hydrolysis of the resin, the PFIEP has an equivalent weight of approximately 1070. NAFION® PFIEP solutions can be purchased from Aldrich Chemical Co., Milwaukee, Wis., or PFIEP solutions generally can be prepared using the procedure of U.S. Pat. No. 5,094,995 and U.S. Pat. No. 4,433,082.

204 g of tetramethoxysilane (TMOS), 33 g of distilled water and 3 g of 0.04 M HCl was stirred for 45 min to give a clear solution. To 300 mL of a NAFION® PFIEP solution was added 150 mL of a 0.4 M NaOH solution, while the PFIEP solution was being stirred. After addition of the NaOH solution, the resulting solution was stirred for a further 15 min. The TMOS solution was added rapidly to the stirred PFIEP solution. After about 10–15 sec, the solution gelled to a solid mass. The gel was placed in an oven and dried at a temperature of about 95° C. over a period of about 2 days followed by drying under vacuum overnight. The hard, glass-like product was ground and passed through a 10-mesh screen. The material was then stirred with 3.5M HCl for 1 hour (with 500 mL of acid), followed by washing with 500 mL deionized water. The solid was collected by filtration. Acidification, washing and filtration were repeated a total of 5 times and after the final wash the solid was dried under vacuum at 100° C. for 24 hours.

EXAMPLE 1

Preparation of a Silylated Microcomposite Using Trimethylsilylchloride 10 g of an unmodified microcomposite (as prepared above) was dried at 150° C. in vacuum overnight. Under nitrogen, this was added to trimethylsilylchloride (50 g) and the material was refluxed under nitrogen for 24 hours. The excess trimethylsilylchloride was removed under vacuum to yield the silylated microcomposite. The silylated microcomposite was very hydrophobic.

EXAMPLE 2

Preparation of a Silylated Microcomposite Using Hexamethyldisilazine 10 g of an unmodified microcomposite (as prepared above) was dried at 150° C. in vacuum overnight. Under nitrogen, this was added to hexamethyldisilazine (50 g) and the material was refluxed under nitrogen for 24 hours. The hexamethyldisilazine excess was removed under vacuum to yield the silylated microcomposite. The silylated microcomposite was very hydrophobic.

EXAMPLE 3

Preparation of a Silylated Microcomposite Using Trimethylsilyl Trifluoromethanesulfonate 10 g of an unmodified microcomposite (as prepared above) is dried at 150° C. in vacuum overnight. Under nitrogen, this is added to trimethylsilyl trifluoromethanesulfonate (50 g) and the material is refluxed under nitrogen for 48 hours and triflic acid is evolved. The trimethylsilyl trifluoromethanesulfonate and triflic acid are removed under vacuum to yield the silylated microcomposite.

What is claimed is:

1. A silylated porous microcomposite, comprising: a perfluorinated ion-exchange polymer containing pendant groups selected from the group consisting of silyl sulfonate groups and a combination of silyl sulfonate groups and sulfonic acid groups, wherein the polymer is entrapped within and highly dispersed throughout a network of inorganic oxide, said network having a plurality of silylated species bonded thereto.

2. The microcomposite of claim 1 wherein the inorganic oxide of the network is silica.

3. The microcomposite of claim 2, wherein the silylated species is a group having the formula —O)$_q$Si(R$^1$)$_{4-q}$, wherein: oxygen is bonded to the inorganic oxide network, each R$^1$ is independently selected from the group consisting of: chloride, and a monovalent hydrocarbon radical; and q is 1, 2 or 3.

4. The microcomposite of claim 1 wherein all or a portion of the pendant groups are silyl sulfonate groups having the formula —($SO_3$)$_x$Si(R$^2$)$_{4-x}$ wherein each R$^2$ is independently selected from the group consisting of: chloride and a monovalent hydrocarbon radical; and x is 1, 2 or 3.

5. The microcomposite of claim 4 wherein all or a portion of the pendant groups are trimethylsilyl sulfonate groups.

6. The microcomposite of claim 1 wherein the perfluorinated ion-exchange polymer contains sulfonic acid groups and trimethylsilyl sulfonate groups and said polymer is about 10 to about 15% by weight of the microcomposite.

7. A process for the preparation of a silylated porous microcomposite, comprising the steps of: contacting a porous microcomposite comprising a perfluorinated ion-exchange polymer containing pendant sulfonic acid groups or pendant metal sulfonate groups, wherein said polymer is entrapped within and highly dispersed throughout a network of inorganic oxide, with a silylating agent under silylating conditions for a time sufficient to convert a plurality of hydroxyl groups of the inorganic oxide network to a silylated species and a portion of the pendant sulfonic acid groups or metal sulfonate groups to silyl sulfonate groups.

8. The process of claim 7 wherein the silylating agent comprises a compound having the formula $-Si(R^3)_{4-n}X_n$, wherein: each $R^3$ is independently selected from a monovalent hydrocarbon radical; X is chloride or trifluoromethane sulfonate; and n is an integer from 1 to 4.

9. The process of claim 1 wherein the silylating agent is selected from the group consisting of: trimethylsilylchloride, trimethylsilyl trifluoromethane sulfonate, and hexamethyldisilazine.

10. The process of claim 7 wherein the silylating agent comprises a compound having the formula $R^4R^5R^6SiNHSiR^7R^8R^9$, wherein $R^4$, $R^5$, $R^6$, $R^7$, $R^8$ and $R^9$ are each independently selected from the group consisting of: chloride and a monovalent hydrocarbon radial.

11. The method of claim 10 wherein the inorganic oxide of the network is silica.

12. The method of claim 11 wherein the inorganic oxide of the network is silica and the silylated species is a group having the formula $-O)_qSi(R^1)_{4-q}$, wherein: oxygen is bonded to the inorganic oxide network, each $R^1$ is independently selected from the group consisting of: chloride, and a monovalent hydrocarbon radical; and q is 1, 2 or 3.

* * * * *